(12) United States Patent
Hirota

(10) Patent No.: US 8,950,365 B2
(45) Date of Patent: Feb. 10, 2015

(54) FEED WATER PIPE FOR STEAM GENERATOR

(75) Inventor: Naoaki Hirota, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/976,771

(22) PCT Filed: Apr. 5, 2012

(86) PCT No.: PCT/JP2012/059365
§ 371 (c)(1),
(2), (4) Date: Jun. 27, 2013

(87) PCT Pub. No.: WO2012/137868
PCT Pub. Date: Oct. 11, 2012

(65) Prior Publication Data
US 2013/0276910 A1    Oct. 24, 2013

(30) Foreign Application Priority Data

Apr. 7, 2011  (JP) ................................. 2011-085438

(51) Int. Cl.
*F22D 1/46*      (2006.01)
*F16L 55/055*    (2006.01)
*F22B 1/02*      (2006.01)
(Continued)

(52) U.S. Cl.
CPC .............. *F16L 55/055* (2013.01); *F22B 1/025* (2013.01); *F22B 37/002* (2013.01); *F22B 37/228* (2013.01); *F22D 11/00* (2013.01); *G21D 1/00* (2013.01)
USPC ........................... 122/438; 122/407; 122/414

(58) Field of Classification Search
CPC ............................. F22B 1/025; F22D 11/006
See application file for complete search history.

(56) References Cited

U.S. PATENT DOCUMENTS 3,937,184 A  *  2/1976  Frei et al. ...................... 122/32
3,991,720 A  *  11/1976  Byerley ......................... 122/32
(Continued)

FOREIGN PATENT DOCUMENTS

JP      61-121304 A      7/1986
JP      1-106710 A       7/1989
(Continued)

OTHER PUBLICATIONS

International Search Report for PCT/JP2012/059365, mailing date of May 29, 2012.
(Continued)

*Primary Examiner* — Gregory A Wilson
(74) *Attorney, Agent, or Firm* — Westerman, Hattori, Daniels & Adrian, LLP

(57) ABSTRACT

There are provided a generator internal pipe section that extends in the horizontal direction inside a steam generator; and a communication pipe section that is connected to the generator internal pipe section and is provided with a communication path, wherein one end of the communication path is connected to the pipe path at an upper end of a cross-section perpendicular to the flow direction of the cooling water in the pipe path and the other end of the communication path is positioned at the downside in the vertical direction in relation to one end of the communication path, and wherein one end side and the other end side of the communication path are connected at a position existing at the upside in the vertical direction in relation to one end.

5 Claims, 4 Drawing Sheets

(51) Int. Cl.
  *F22B 37/00*  (2006.01)
  *F22B 37/22*  (2006.01)
  *F22D 11/00*  (2006.01)
  *G21D 1/00*  (2006.01)

(56) References Cited

U.S. PATENT DOCUMENTS

| | | | | |
|---|---|---|---|---|
| 4,212,594 | A * | 7/1980 | Sheer, Jr. | 417/54 |
| 4,247,262 | A * | 1/1981 | Lipstein | 417/54 |
| 4,502,419 | A * | 3/1985 | Smith, Jr. | 122/32 |
| 5,083,529 | A * | 1/1992 | Sundheimer | 122/32 |
| 5,110,538 | A * | 5/1992 | Pascal et al. | 376/402 |
| 6,173,680 | B1 | 1/2001 | Dague et al. | |
| 7,314,024 | B2 * | 1/2008 | Ayme et al. | 122/487 |

FOREIGN PATENT DOCUMENTS

| | | |
|---|---|---|
| JP | 3-87501 A | 4/1991 |
| JP | 10-122502 A | 5/1998 |
| JP | 2000-9888 A | 1/2000 |

OTHER PUBLICATIONS

Written Opinion for PCT/JP2012/059365, mailing date of May 29, 2012.

English Translation of Written Opinion for PCT/JP2012/059365, dated May 29, 2012.

* cited by examiner

FEED WATER PIPE FOR STEAM GENERATOR

FIELD

The present invention relates to a feed water pipe for a steam generator.

BACKGROUND

Hitherto, there is a known feed water pipe which supplies cooling water into a steam generator such as a pressurized water reactor. In the feed water pipe, a thermal stratification phenomenon may occur due to vapor flowing into the pipe. The thermal stratification phenomenon is not desirable in that it causes a stress of a fatigue source. Further, when the vapor flowing into the pipe remains in the pipe after the supply of water is performed again, there is a possibility that water hammer occurs. The water hammer is not desirable in that it generates an impact on an inner pipe.

Patent Literature 1 discloses a technique of a feed water pipe of a steam generator in which a weir is attached to an inner upper wall of a feed water pipe bent to raise a water supply ring. Patent Literature 2 discloses a technique of a water supply and discharge pipe structure of a steam generator with a body and a heat exchange pipe group provided inside the body in which a plurality of horizontal outlet ports are bored in an upper pipe wall of a horizontal water supply ring provided in the upper portion inside the body and communicating with a feed water pipe outside the body.

CITATION LIST

Patent Literature

Patent Literature 1: Japanese Utility Model Application Laid-open No. 61-121304
Patent Literature 2: Japanese Patent Application Laid-open No. 10-122502

SUMMARY

Technical Problem

There is room for examining how to suppress the thermal stratification and the water hammer inside the feed water pipe. It is an object of the invention to provide a feed water pipe for a steam generator capable of suppressing thermal stratification and suppressing water hammer inside a pipe.

Solution to Problem

A feed water pipe for a steam generator of the present invention is characterized in that it includes: a generator internal pipe section that extends in the horizontal direction inside a steam generator and includes a pipe path through which cooling water supplied from the outside of the steam generator circulates; and a communication pipe section that is connected to the generator internal pipe section and is provided with a communication path which allows communication between the pipe path and a space outside the generator internal pipe section inside the steam generator, wherein one end of the communication path is connected to the pipe path at an upper end of a cross-section perpendicular to a flow direction of the cooling water in the pipe path and another end of the communication path is positioned lower than the one end of the communication path in a vertical direction, and wherein the one end side and the another end side of the communication path are connected at a position higher than the one end in the vertical direction.

According to the feed water pipe for the steam generator, since the other end of the communication path is suppressed from being exposed to the gas layer and the vapor is suppressed from flowing into the pipe path, it is possible to suppress the water hammer inside the feed water pipe for the steam generator.

It is preferable in the feed water pipe for the steam generator that another end of the communication path is positioned at or lower than a position of a lower end of the generator internal pipe section in the vertical direction.

According to the feed water pipe for the steam generator, even when the water level inside the steam generator is lowered to the lower end of the generator internal pipe section, it is possible to suppress the other end of the communication path from being exposed to the gas layer.

It is preferable in the feed water pipe for the steam generator that another end of the communication path is positioned lower than a target water level of the cooling water in the exterior space in the vertical direction.

According to the feed water pipe for the steam generator, when the water level inside the steam generator is equal to or higher than the target water level, it is possible to suppress the other end of the communication path from being exposed to the gas layer.

It is preferable in the feed water pipe for the steam generator that it further includes: an insertion pipe section that is inserted into a penetration hole penetrating an outer shell member of the steam generator and that extends in a horizontal direction, wherein the cooling water supplied from the outside of the steam generator flows into the pipe path through the insertion pipe section, and wherein the upper end of the cross-section perpendicular to the flow direction of the cooling water of the pipe path is positioned higher than an upper end of an inner wall surface of the insertion pipe section in the vertical direction.

According to the feed water pipe for the steam generator, even when the vapor enters the pipe path, the vapor is suppressed from reaching the insertion pipe section. Further, even when the vapor flows from the exterior space into the pipe path, the vapor is suppressed from reaching the insertion pipe section. Further, when the cooling water is supplied from the outside of the steam generator to the insertion pipe section while the vapor remains in the insertion pipe section, the vapor inside the insertion pipe section immediately flows off. Accordingly, the thermal stratification in the insertion pipe section is suppressed.

It is preferable in the feed water pipe for the steam generator that the another end of the communication path is positioned lower than the upper end of the inner wall surface of the insertion pipe section in the vertical direction.

According to the feed water pipe for the steam generator, even when the water level inside the steam generator is lowered to the upper end of the inner wall surface of the insertion pipe section, it is possible to suppress the other end of the communication path from being exposed to the gas layer.

It is preferable in the feed water pipe for the steam generator that a lower end of the pipe path is positioned upper than the upper end of the inner wall surface of the insertion pipe section in the vertical direction.

According to the feed water pipe for the steam generator, even when the water level inside the steam generator is lowered to the lower end of the pipe path, it is possible to maintain a state where the insertion pipe section is filled with the cooling water. Accordingly, the vapor is suppressed from entering the insertion pipe section, and hence the thermal stratification in the insertion pipe section may be suppressed.

Advantageous Effects of Invention

According to the invention, it is possible to suppress the thermal stratification and the water hammer inside the pipe of the feed water pipe for the steam generator.

DESCRIPTION OF EMBODIMENTS

Figure 1:
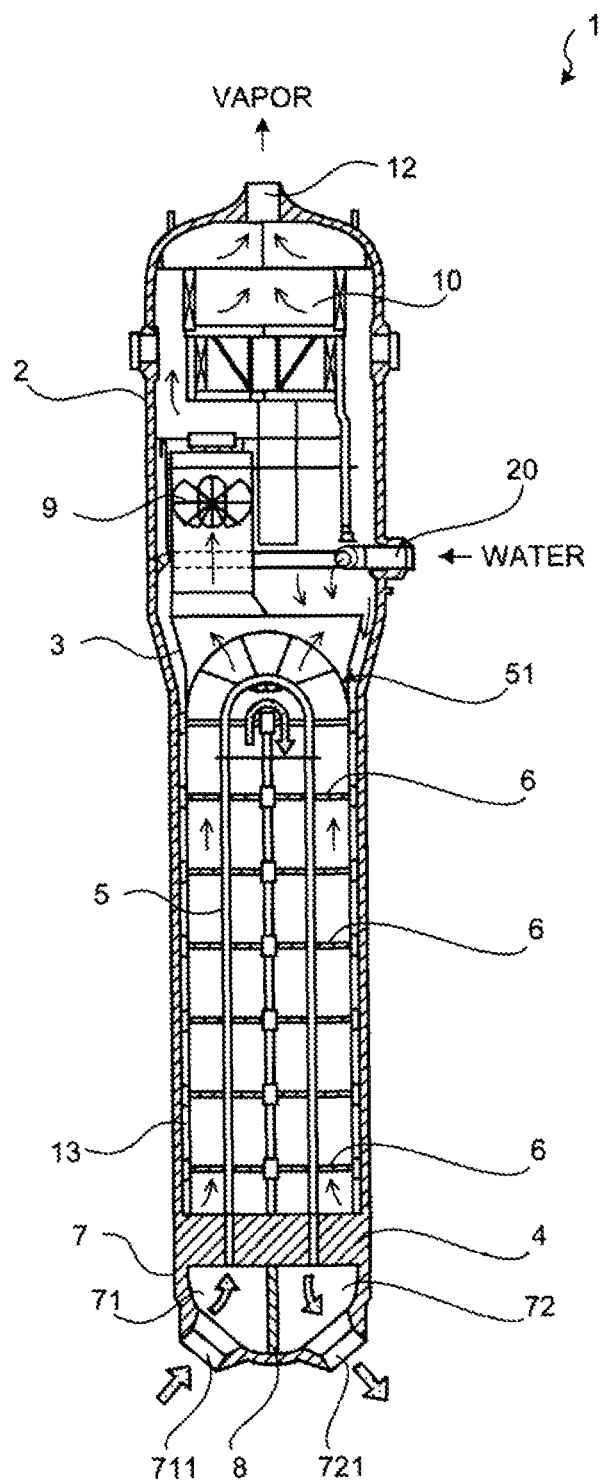
FIG. 1 is a schematic diagram illustrating a steam generator according to an embodiment.

Hereinafter, a feed water pipe for a steam generator according to embodiments of the invention will be described in detail by referring to the drawings. Furthermore, the invention is not limited to the embodiments. Further, the components in the embodiments below include a component which may be easily supposed by a person skilled in the art or a component which has substantially the same configuration.

First Embodiment

Figure 2:
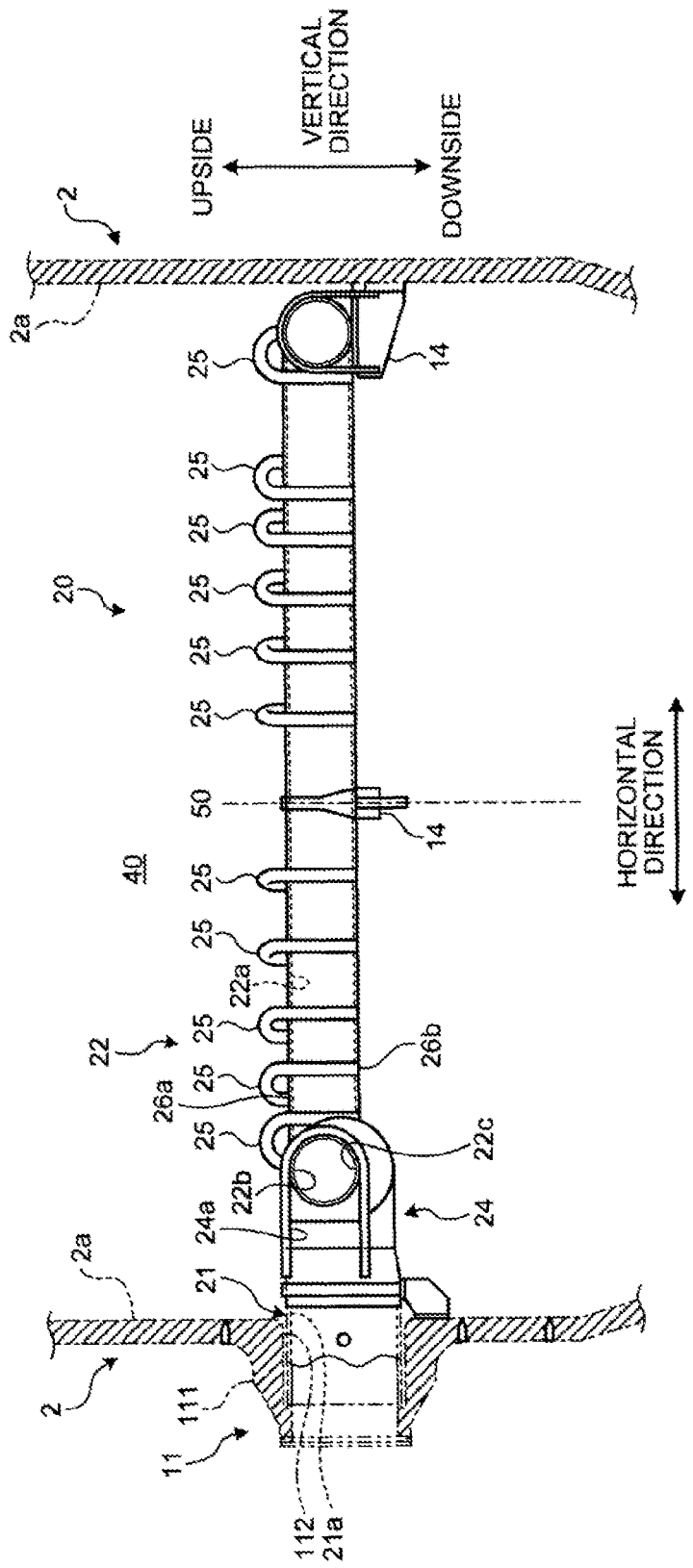
FIG. 2 is a cross-sectional view illustrating a feed water pipe for a steam generator according to a first embodiment.
Figure 3:
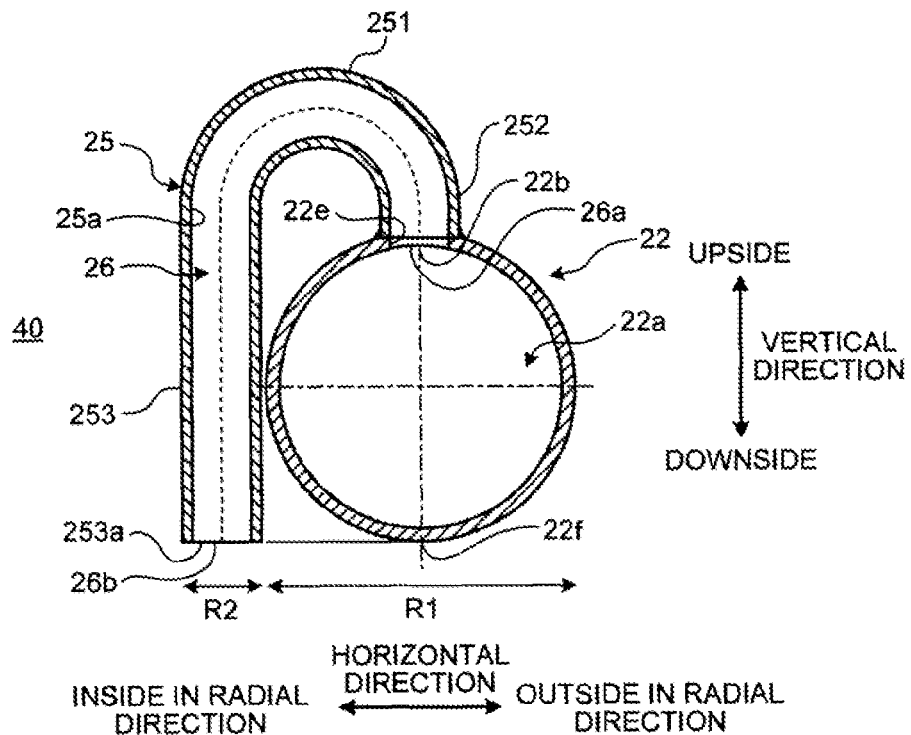
FIG. 3 is a cross-sectional view illustrating a main part of the feed water pipe for the steam generator according to the embodiment.

Referring to FIGS. 1 to 4, a first embodiment will be described. The embodiment relates to a feed water pipe for a steam generator. FIG. 1 is a schematic diagram illustrating a steam generator according to the embodiment, FIG. 2 is a cross-sectional view illustrating the feed water pipe for the steam generator according to the embodiment, and FIG. 3 is a cross-sectional view illustrating a main part of the feed water pipe for the steam generator according to the embodiment. FIG. 2 illustrates a cross-sectional diagram when the feed water pipe for the steam generator is viewed in the horizontal direction.

A steam generator 1 is used in, for example, a pressurized water reactor (PWR). The pressurized water reactor uses light water as a nuclear reactor coolant and a neutron moderator. In the pressurized water reactor, hot and pressurized light water which is not boiled throughout an entire reactor core is sent as primary cooling water to the steam generator 1. The steam generator 1 transfers the heat of the hot and pressurized primary cooling water to secondary cooling water so as to generate vapor in the secondary cooling water. Then, the vapor rotates a turbine generator so as to generate power.

As illustrated in FIG. 1, the steam generator 1 includes a body section 2 which extends in the up and down direction and forms a hermetic hollow cylindrical shape so that the diameter of the lower half portion is smaller than that of the upper half portion. The body section 2 is an outer shell member of the steam generator 1. A cylindrical tube bundle shroud 3 is provided inside the lower half portion of the body section 2 with a predetermined gap with respect to the inner wall surface of the body section 2. In the tube bundle shroud 3, the lower end thereof extends to a pipe plate 4 disposed at the lower side inside the lower half portion of the body section 2, and a predetermined gap is formed with respect to the upper surface of the pipe plate 4. A heat transfer pipe group 51 with a plurality of heat transfer pipes 5 formed in a reverse U-shape is provided inside the tube bundle shroud 3. Each heat transfer pipe 5 is disposed so that the U-shaped circular-arc portion faces the upside, where its end facing the downside is supported by the pipe plate 4 and its intermediate portion is supported by a plurality of pipe supporting plates 6. The pipe supporting plates 6 are provided with a plurality of penetration holes (not illustrated), and each heat transfer pipe 5 penetrates the penetration hole while the heat transfer pipe 5 is not fastened thereto.

The lower end of the body section 2 is provided with a channel head 7. The inside of the channel head 7 is divided by a partition wall 8 into an inlet chamber 71 and an outlet chamber 72. One end of each heat transfer pipe 5 is connected to the inlet chamber 71, and the other end of each heat transfer pipe 5 is connected to the outlet chamber 72. Further, the inlet chamber 71 includes an inlet nozzle 711 which communicates with the outside of the channel head 7, and the outlet chamber 72 includes an outlet nozzle 721 which communicates with the outside of the channel head 7. Then, the inlet nozzle 711 is connected with a cooling water pipe (not illustrated) to which the primary cooling water is sent from the pressurized water reactor, and the outlet nozzle 721 is connected with a cooling water pipe (not illustrated) through which the primary cooling water subjected to the heat exchange is sent to the pressurized water reactor.

The upper half portion of the body section 2 is provided with a steam-water separator 9 which separates steam into vapor and hot water and a moisture separator 10 which removes moisture of the separated vapor so as to obtain substantially dry vapor. A feed water pipe for a steam generator (hereinafter, simply referred to as a "feed water pipe") 20 which supplies the secondary cooling water into the body section 2 from the outside is inserted to the outer periphery of the steam-water separator 9. Further, the upper end of the body section 2 is provided with a vapor discharge port 12. Further, a water supply path 13 is provided inside the lower half portion of the body section 2 so as to cause the secondary cooling water, which is supplied from the feed water pipe 20 into the body section 2, to flow down between the body section 2 and the tube bundle shroud 3 and to return at the pipe plate 4 so that the secondary cooling water rises along the heat transfer pipe group 51. Furthermore, the vapor discharge port 12 is connected with a vapor supply path (not illustrated) that sends the vapor to the turbine, and the feed water pipe 20 is connected with a cooling water pipe (not illustrated) that supplies the secondary cooling water in which the vapor used in the turbine is cooled by a condenser (not illustrated).

In such a steam generator 1, the primary cooling water which is heated by the pressurized water reactor is sent to the inlet chamber 71, and reaches the outlet chamber 72 through the plurality of heat transfer pipes 5. Meanwhile, the secondary cooling water which is cooled by the condenser is sent to the feed water pipe 20, and is supplied to the body section 2 through the feed water pipe 20. In the embodiment, the secondary cooling water is simply referred to as "cooling water". The cooling water supplied in to the body section 2 passes through the water supply path 13 and rises along the heat transfer pipe group 51. At this time, a heat exchange between the hot and pressurized primary cooling water and the secondary cooling water is performed inside the body section 2. Then, the cooled primary cooling water is returned from the outlet chamber 72 to the pressurized water reactor. Meanwhile, the secondary cooling water which exchanges heat with the hot and pressurized primary cooling water rises inside the body section 2, and is separated into vapor and hot water by the steam-water separator 9. Then, the separated vapor is sent to the turbine after its moisture is removed by the moisture separator 10.

Here, there is a possibility that thermal stratification may occur inside the feed water pipe 20 such that the vapor and the cooling water are stratified or the high-temperature cooling water and the low-temperature cooling water are stratified. When the thermal stratification occurs, a stress which becomes a fatigue source is generated, and hence this is not desirable. Further, when the inflowing vapor remains inside the pipe after the supply of water is performed again, there is a possibility that the water hammer may occur. The water hammer is not desirable it that the water hammer applies an impact on the inner pipe. It is desirable to suppress the occurrence of the thermal stratification and the water hammer in the feed water pipe 20.

As will be described in detail below, the feed water pipe 20 according to the embodiment includes a communication pipe section 25 (see FIG. 2) capable of suppressing the occurrence of the water hammer in the feed water pipe 20. The communication pipe section 25 is an outflow pipe through which the cooling water inside a pipe path 22a flows out toward a space 40 inside the steam generator 1. As illustrated in FIG. 3, the communication pipe section 25 is provided with a communication path 26 which causes the pipe path 22a of a generator internal pipe section 22 to communicate with the exterior space 40 of the generator internal pipe section 22. One end 26a of the communication path 26 is connected to the pipe path 22a, and the other end 26b thereof is opened toward the exterior space 40. The other end 26b of the communication path 26 is positioned at the lower side of one end 26a in the vertical direction. Thus, it is possible to suppress the other end 26b from being exposed to the gas layer even when the water level of the cooling water in the exterior space 40 decreases. Accordingly, it is possible to suppress the vapor from flowing into the pipe path 22a through the communication path 26. Accordingly, according to the feed water pipe 20 of the embodiment, the water hammer inside the feed water pipe 20 is suppressed.

As illustrated in FIG. 2, the feed water pipe 20 includes an insertion pipe section 21, the generator internal pipe section 22, a connection pipe section 24, and the communication pipe section 25. The insertion pipe section 21, the generator internal pipe section 22, the connection pipe section 24, and the communication pipe section 25 are all tubular members having a circular cross-section. Each of the insertion pipe section 21, the generator internal pipe section 22, the connection pipe section 24, and the communication pipe section 25 is provided with a pipe path having a circular cross-section in the axial direction. The cooling water which is supplied from the outside of the steam generator 1 flows from the insertion pipe section 21 to the pipe path 22a of the generator internal pipe section 22 through the connection pipe section 24. The cooling water inside the pipe path 22a flows out to the space 40 inside the steam generator 1 through the communication pipe section 25.

The body section 2 includes a nozzle 11. The nozzle 11 includes a protrusion portion 111 which protrudes outward in the radial direction of the body section 2. Further, the nozzle 11 is provided with a penetration hole 112 which penetrates the nozzle 11 in the axial direction of the protrusion portion 111. The penetration hole 112 penetrates the protrusion portion 111 in the radial direction of the body section 2. The insertion pipe section 21 is fitted to the penetration hole 112 from the inside of the body section 2 in the radial direction. The insertion pipe section 21 is fixed to the nozzle 11 by welding or the like while the outer peripheral surface of the insertion pipe section 21 faces the inner peripheral surface of the protrusion portion 111. That is, the insertion pipe section 21 is inserted into the penetration hole 112 which penetrates the body section 2 of the steam generator 1. The center axis of the nozzle 11, that is, the center axis of the penetration hole 112 is horizontal, and the insertion pipe section 21 extends in the horizontal direction so as to correspond thereto. Further, the insertion pipe section 21 extends in a linear shape, and the extension direction becomes the radial direction of the body section 2.

The generator internal pipe section 22 is disposed inside the body section 2, that is, the steam generator 1. The generator internal pipe section 22 is formed in an annular shape, and is disposed horizontally. That is, the generator internal pipe section 22 extends in the circumferential direction of the body section 2 along an inner wall surface 2a of the body section 2. For example, the generator internal pipe section 22 may be disposed so that a center axis 50 of the body section 2 and the center axis of the annular shape exist on the same axis. The generator internal pipe section 22 is supported by the inner wall surface 2a of the body section 2 through a stay 14.

The pipe path 22a, through which the cooling water supplied from the outside of the steam generator 1 circulates, is formed inside the generator internal pipe section 22. The pipe path 22a also extends in the horizontal direction so as to correspond to the generator internal pipe section 22 extending in the horizontal direction. That is, in the pipe path 22a, an upper end 22b of a cross-section perpendicular to the flow direction of the cooling water is present at the same vertical position in a cross-section of any axial position. Further, in the pipe path 22a, a lower end 22c of a cross-section perpendicular to the flow direction of the cooling water is present at the same vertical position in a cross-section of any axial position. In this way, the pipe path 22a is a pipe path which extends on the horizontal plane having the same center axis and has the same inner diameter.

The connection pipe section 24 connects the insertion pipe section 21 to the generator internal pipe section 22. The connection pipe section 24 extends in the horizontal direction on the extension line of the insertion pipe section 21. In the connection pipe section 24, the end opposite to the connection side with respect to the insertion pipe section 21 is connected to the generator internal pipe section 22. The connection pipe section 24 becomes a branch pipe which is branched from the generator internal pipe section 22 outward in the radial direction of the body section 2.

In the embodiment, the insertion pipe section 21, the connection pipe section 24, and the generator internal pipe section 22 are disposed so that the upper ends of the respective pipe paths exist at the same height position. That is, an upper end 21a of the inner wall surface (pipe path) of the insertion pipe section 21 in the connection portion between the insertion pipe section 21 and the connection pipe section 24, an upper end 24a of the pipe path of the connection pipe section 24, and the upper end 22b of the cross-section perpendicular to the flow direction of the cooling water in the pipe path 22a of the generator internal pipe section 22 are present at the same vertical height position. In other words, in the feed water pipe 20, the height position of the upper end in the cross-section perpendicular to the flow direction of the cooling water is the same at all positions of the feed water pipe 20. In this way, since the positions of the upper ends may be aligned, it is possible to suppress the vapor from remaining inside the feed water pipe 20. Furthermore, the center axis of the insertion pipe section 21, the center axis of the connection pipe section 24, and the center axis of the generator internal pipe section 22 may be present at the same vertical height position.

The pipe diameter (inner diameter) of the connection pipe section 24 may be set to be equal to, for example, the pipe diameter of the insertion pipe section 21. Further, the pipe diameter of the generator internal pipe section 22 is set to be smaller than, for example, the pipe diameters of the insertion pipe section 21 and the connection pipe section 24.

The generator internal pipe section 22 is connected with the communication pipe section 25. The communication pipe section 25 is formed in a reverse U-shape and a reverse J-shape. A plurality of the communication pipe sections 25 are arranged in the axial direction of the generator internal pipe section 22. The communication pipe sections 25 are arranged at the same interval, for example, in the axial direction of the generator internal pipe section 22.

FIG. 3 is a cross-sectional view illustrating the generator internal pipe section 22 and the communication pipe section 25. FIG. 3 illustrates the cross-section perpendicular to the axial direction of the generator internal pipe section 22, that is, the cross-section perpendicular to the flow direction of the cooling water of the generator internal pipe section 22. As illustrated in FIG. 3, the communication pipe section 25 is provided with a pipe path 25a. The pipe path 25a serves as the communication path 26 that causes the exterior space 40 of the generator internal pipe section 22 to communicate with the pipe path 22a of the generator internal pipe section 22 inside the steam generator 1.

The communication pipe section 25 includes a curved portion 251, a first straight pipe section 252, and a second straight pipe section 253. The curved portion 251 is formed in a reverse U-shape and is curved so that the center is positioned at the upside in relation to both ends in the vertical direction. The first straight pipe section 252 and the second straight pipe section 253 are respectively linear pipe sections, and extend in the vertical direction. The first straight pipe section 252 connects one end of the curved portion 251 to the generator internal pipe section 22 in the vertical direction. For example, the curved portion 251 may be directly connected to the generator internal pipe section 22 by removing the first straight pipe section 252.

The first straight pipe section 252 is connected to the top portion of the generator internal pipe section 22, that is, the upper end of the cross-section perpendicular to the flow direction of the cooling water of the generator internal pipe section 22. A communication hole 22e which causes the pipe path 25a to communicate with the pipe path 22a is formed at the connection position between the generator internal pipe section 22 and the first straight pipe section 252. That is, the communication hole 22e serves as a part of the communication path 26 which causes the pipe path 22a to communicate with the exterior space 40. In the embodiment, the communication path 26 includes the pipe path 25a of the communication pipe section 25 and the communication hole 22e. In the embodiment, the diameter of the communication hole 22e is set to be equal to the diameter of the pipe path 25a of the communication pipe section 25.

For example, a relation between the pipe diameter (inner diameter) of the communication pipe section 25 and the pipe diameter of the generator internal pipe section 22 may be set so that the sum of the cross-sectional area of the path of the communication pipe section 25 becomes equal to the cross-sectional area of the path of the generator internal pipe section 22.

The second straight pipe section 253 is connected to the other end of the curved portion 251. The second straight pipe section 253 is positioned at the inside in the radial direction of the annular shape of the generator internal pipe section 22 in relation to the generator internal pipe section 22. The second straight pipe section 253 extends from the connection portion with respect to the curved portion 251 to the height position corresponding to the lower end of the generator internal pipe section 22 through the side portion of the generator internal pipe section 22. The curved portion 251 reverses the flow direction of the cooling water from the upward direction to the downward direction and ensures a gap between the first straight pipe section 252 and the second straight pipe section 253 so that the second straight pipe section 253 does not interfere with the generator internal pipe section 22. In the cross-section perpendicular to the axial direction of the generator internal pipe section 22, a region R1 existing in the generator internal pipe section 22 and a region R2 existing in the second straight pipe section 253 become different regions in the horizontal direction. In this way, an appropriate gap is ensured between the second straight pipe section 253 and the generator internal pipe section 22.

When the cooling water is supplied from the outside of the steam generator 1 to the pipe path 22a, the cooling water inside the pipe path 22a flows out to the exterior space 40 through the communication path 26 by a hydraulic pressure. A lower end surface 253a of the second straight pipe section 253 becomes a horizontal surface. That is, the end opposite to the pipe path 22a in the communication path 26 is opened toward the lower side of the vertical direction. Thus, the cooling water flowing through the communication path 26 flows out toward the downside in the vertical direction.

Since the top portion of the generator internal pipe section 22 is provided with the communication hole 22e, it is possible to suppress the vapor from remaining in the generator internal pipe section 22. Even when the vapor remains inside the generator internal pipe section 22, the vapor is discharged from the communication hole 22e to the outside of the generator internal pipe section 22 along with the outflow of the cooling water. Accordingly, it is possible to suppress the occurrence of the water hammer caused by the vapor remaining inside the generator internal pipe section 22.

Further, since the communication pipe section 25 connected to the communication hole 22e is formed in a reverse J-shape which is curved upward in the vertical direction, it is possible to suppress the vapor from entering the generator internal pipe section 22 through the communication pipe section 25. The communication pipe section 25 extends upward in the vertical direction from the communication hole 22e, and is returned at the lower side of the curved portion 251 in the vertical direction. Accordingly, the communication path 26 extends upward in the vertical direction from one end 26a connected to the pipe path 22a, and is returned at the lower side of the curved portion 251 in the vertical direction. In this way, since the other end 26b of the communication path 26 is returned downward in the vertical direction, it is possible to suppress the other end 26b from being exposed to the gas layer. Since the exposure of the other end 26b is suppressed, it is possible to suppress the vapor from entering the pipe path 22a through the communication path 26.

Further, since the height position of the outflow port of the communication path 26 is lowered in the feed water pipe 20 according to the embodiment, it is possible to suppress the vapor from entering the pipe path 22a. Specifically, in the communication path 26, the other end 26b is positioned at the downside in the vertical direction in relation to one end 26a connected to the pipe path 22a. In the description below, the other end 26b of the communication path 26 is referred to as the "outflow port 26b". One end 26a of the communication path 26 is connected to the pipe path 22a at the upper end 22b of the cross-section perpendicular to the flow direction of the cooling water of the pipe path 22a, and the other end 26b of the communication path 26 is positioned at the downside in the vertical direction in relation to the upper end 22b. Thus, even when the water level of the cooling water in the exterior space 40 is lowered to the position of the upper end 22b of the pipe path 22a, the other end 26b of the communication path 26 is positioned below the water level of the cooling water. For this reason, it is possible to suppress the vapor of the exterior space 40 from flowing into the pipe path 22a through the communication path 26.

Particularly, in the embodiment, the other end 26b of the communication path 26 is present at a position equal to or lower than the lower end of the generator internal pipe section 22 in the vertical direction. As illustrated in FIG. 3, the other end 26b of the communication path 26 is present at a position equal to or lower than a lower end 22f of the cross-section perpendicular to the flow direction of the cooling water in the generator internal pipe section 22, that is, a position equal to or lower than the lower end 22f of the outer peripheral surface of the generator internal pipe section 22 in the vertical direction. Accordingly, even when the water level of the cooling water of the exterior space 40 is lowered to the lower end 22f of the generator internal pipe section 22, it is possible to suppress the vapor of the exterior space 40 from flowing into the pipe path 22a through the communication path 26.

Further, in the feed water pipe 20 according to the embodiment, even when the lower end surface 253a of the communication pipe section 25 is exposed to the gas layer, it is possible to suppress the vapor from entering the pipe path 22a of the generator internal pipe section 22. Since the communication pipe section 25 is formed in a shape which is curved upward in the vertical direction, the first straight pipe section 252 near one end 26a of the communication path 26 and the second straight pipe section 253 near the other end 26b are connected to each other at a position above one end 26a in the vertical direction. Since the curved portion 251 which connects the first straight pipe section 252 to the second straight pipe section 253 is positioned above one end 26a in the vertical direction, even when the vapor of the exterior space 40 enters the communication path 26 from the other end 26b, it is possible to suppress the vapor from entering one end 26a in relation to the curved portion 251.

Further, in the feed water pipe 20 according to the embodiment, it is possible to suppress the cooling water inside the pipe path 22a from flowing to the outside when the supply of the cooling water is stopped. Since the communication hole 22e is formed at the top portion of the generator internal pipe section 22, it is possible to suppress the cooling water inside the generator internal pipe section 22 from flowing to the outside through the communication hole 22e when the supply of the cooling water is stopped. Further, the curved portion 251 which connects the first straight pipe section 252 to the second straight pipe section 253 is positioned at the upside in the vertical direction in relation to one end 26a. Accordingly, even when the cooling water inside the second straight pipe section 253 and the curved portion 251 flows out to the exterior space 40 in a case where the lower end surface 253a of the communication pipe section 25 is exposed to the gas layer, the cooling water remains in the first straight pipe section 252. Thus, it is possible to suppress the cooling water inside the pipe path 22a from flowing to the outside.

In this way, in the feed water pipe 20 according to the embodiment, the vapor is suppressed from entering the pipe path 22a and the cooling water inside the pipe path 22a is suppressed from flowing to the outside when the supply of the cooling water from the outside is stopped. Accordingly, the water hammer inside the feed water pipe 20 is suppressed.

The communication pipe section 25 of the embodiment is formed in a reverse J-shape, but the shape of the communication pipe section 25 is not limited thereto. Regardless of the shape of the communication pipe section 25 in the axial direction, it is possible to obtain the effect that suppresses the vapor from entering the pipe path 22a when the end opposite to the pipe path 22a is positioned at the downside in the vertical direction in relation to the end connected to the pipe path 22a in the communication path 26.

In the embodiment, the lower end surface 253a of the second straight pipe section 253 is formed as a horizontal surface, but the invention is not limited thereto. For example, the lower end surface 253a, that is, the end surface opposite to the connection side with respect to the generator internal pipe section 22 in the communication pipe section 25 may be inclined with respect to the horizontal direction. In this case, the position of the other end 26b of the communication path 26 in the vertical direction may be set as, for example, the uppermost position of the other end 26b in the vertical direction.

Figure 4:
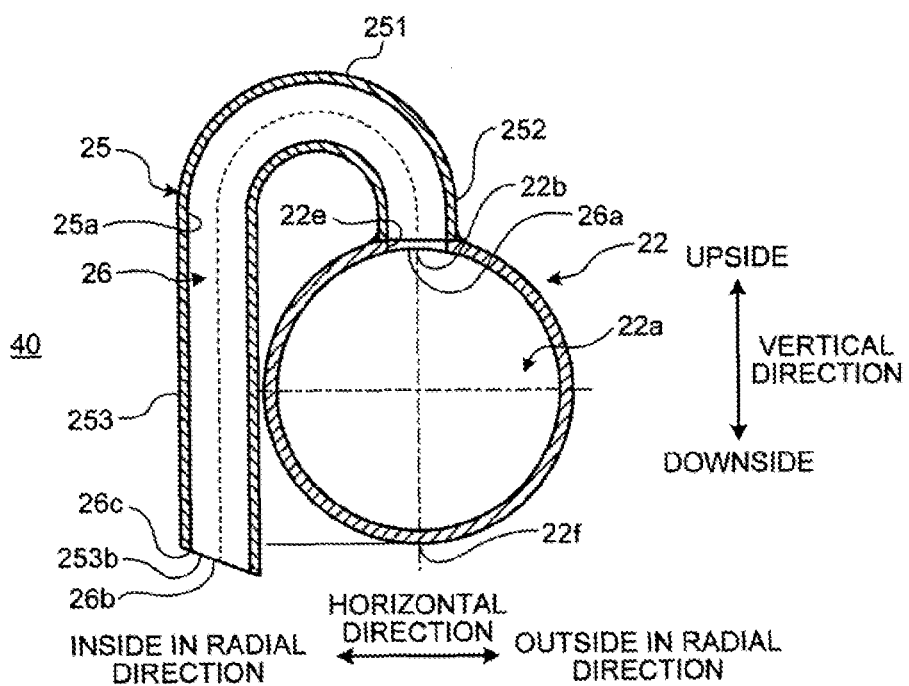
FIG. 4 is a diagram illustrating an example of a communication pipe section with an inclined lower end surface.

FIG. 4 is a diagram illustrating an example of the communication pipe section 25 with an inclined lower end surface. As illustrated in FIG. 4, when a lower end surface 253b of the communication pipe section 25 is inclined with respect to the horizontal plane, an upper end 26c of the other end 26b of the communication path 26 in the vertical direction may be represented as the position of the other end 26b in the vertical direction. That is, the upper end 26c as a portion which is first exposed to the gas layer in the other end 26b of the communication path 26 when the water level of the cooling water of the exterior space 40 is lowered may be positioned at the downside in relation to one end 26a of the communication path 26 or the lower end 22f of the generator internal pipe section 22 in the vertical direction.

In the communication pipe section 25 of the embodiment, the outflow port 26b of the communication path 26 is positioned at the inside in the radial direction of the annular shape in relation to the generator internal pipe section 22. However, instead of this arrangement, the outflow port 26b may be positioned at the outside in the radial direction of the annular shape in relation to the generator internal pipe section 22.

The generator internal pipe section 22 of the embodiment is formed in an annular shape, but the shape of the generator internal pipe section 22 is not limited thereto.

Modified Example of First Embodiment

A modified example of the first embodiment will be described. In the first embodiment, the position of the other end 26b of the communication path 26 in the vertical direction is defined based on the position of one end 26a of the communication path 26 or the lower end 22f of the generator internal pipe section 22. In the modified example, instead of this arrangement, the position of the other end 26b of the communication path 26 is defined in advance based on the target water level in the control of the water level of the cooling water of the exterior space 40. Furthermore, the target water level of the cooling water is defined depending on the control parameter of the nuclear plant with the steam generator 1.

For example, the other end 26b of the communication path 26 may be set so as to be positioned at the downside in the vertical direction in relation to the lower limit defined in advance at the target water level of the cooling water. For example, when the target water level changes in accordance with the operation status of the nuclear plant, the other end 26b of the communication path 26 may be disposed at the downside in the vertical direction in relation to the lower limit of the target water level which may be set. In this way, even when the control target of the water level is set to any position in a predetermined selectable range, the other end 26b is suppressed from being exposed to the gas layer.

Furthermore, a method of defining the position of the other end 26b of the communication path 26 based on the target water level of the cooling water is not limited thereto. For example, the position of the other end 26b may be defined so that the other end 26b is positioned at the downside in relation to the target water level in the normal operation state of the nuclear plant.

Second Embodiment

Figure 5:
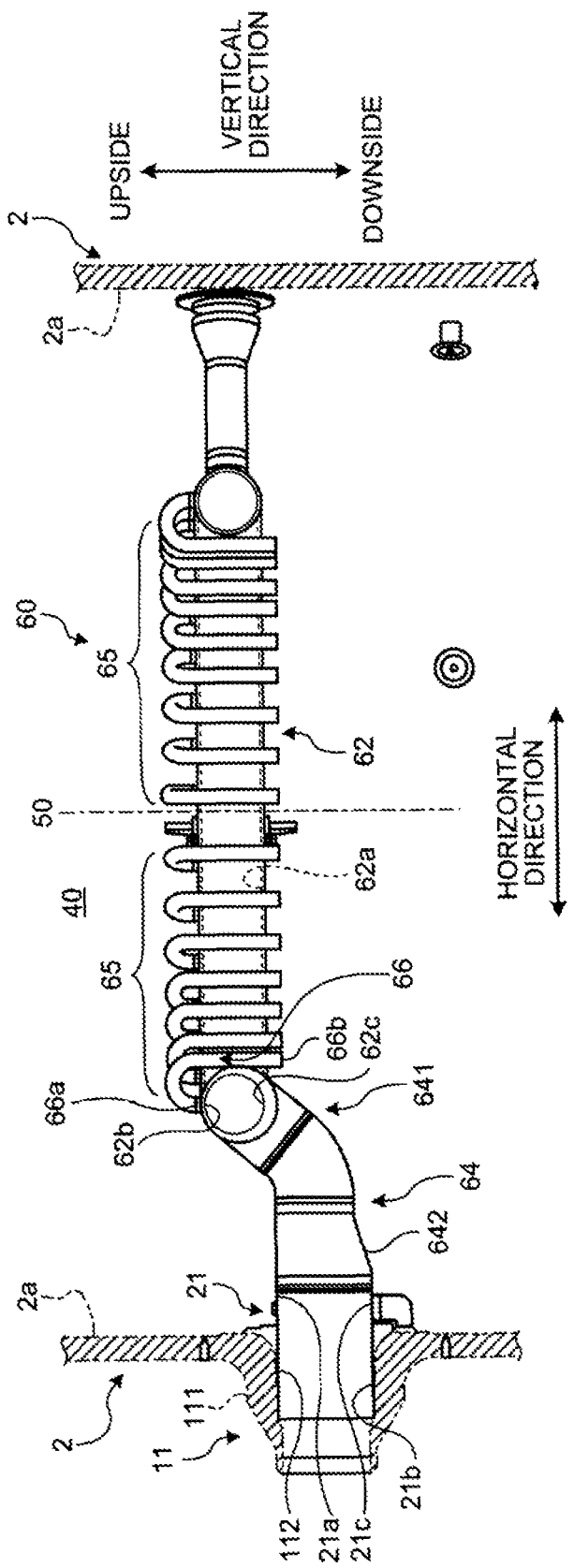
FIG. 5 is a cross-sectional view illustrating a feed water pipe for a steam generator according to a second embodiment.

Referring to FIG. 5, a second embodiment will be described. In the second embodiment, the same reference sign is given to the component having the same configuration as that of the above-described embodiment, and the description thereof will not be repeated. FIG. 5 is a cross-sectional view illustrating a feed water pipe for a steam generator according to the second embodiment. FIG. 5 illustrates a cross-sectional view when the feed water pipe for the steam generator is viewed in the horizontal direction as in FIG. 2.

A feed water pipe 60 of the embodiment is different from the feed water pipe 20 of the first embodiment in that a generator internal pipe section 62 is disposed at the upside in the vertical direction in relation to the insertion pipe section 21. Thus, the thermal stratification inside the insertion pipe section 21 is effectively suppressed.

The generator internal pipe section 62 is formed in an annular shape as in the generator internal pipe section 22 of the first embodiment, and is disposed horizontally inside the steam generator 1. Further, a pipe path 62a formed in the generator internal pipe section 62 extends in the horizontal direction as in the pipe path 22a of the first embodiment. In a case where the pipe diameter of the generator internal pipe section 62 is smaller than the pipe diameter of the insertion pipe section 21, a tapered portion 642 is formed in a connection pipe section 64 so as to correspond thereto. In the tapered portion 642, the pipe diameter of the connection pipe section 64 gradually decreases from the insertion pipe section 21 toward the generator internal pipe section 62. In accordance with a decrease in the pipe diameter, the pipe bottom of the tapered portion 642 is inclined upward in the vertical direction from the insertion pipe section 21 toward the generator internal pipe section 62.

An upper end 62b of the cross-section perpendicular to the flow direction of the cooling water of the pipe path 62a is positioned at the upside in the vertical direction in relation to the upper end 21a of the inner wall surface of the insertion pipe section 21 at the connection portion between the insertion pipe section 21 and the connection pipe section 64. That is, the connection position between a communication path 66 and the pipe path 62a in the vertical direction is positioned at the upside in relation to the upper end 21a of the inner wall surface of the insertion pipe section 21. Accordingly, the connection pipe section 64 includes an inclined portion 641 of which the side near the generator internal pipe section 62 is positioned at the upside in relation to the side near the insertion pipe section 21 in the flow direction of the cooling water. In other words, the connection pipe section 64 is bent with respect to the insertion pipe section 21 so as to raise the generator internal pipe section 62.

In this way, since the generator internal pipe section 62 is positioned at the upside in the vertical direction with respect to the insertion pipe section 21, the thermal stratification in the insertion pipe section 21 is suppressed. For example, even when the vapor enters the pipe path 62a of the generator internal pipe section 62, the vapor is suppressed from reaching the insertion pipe section 21. Further, in a case where the vapor of the exterior space 40 flows into the generator internal pipe section 62 through the communication path 66, the vapor is suppressed from reaching the insertion pipe section 21. Further, in a case where the cooling water is supplied from the outside of the steam generator 1 into the insertion pipe section 21 while the vapor remains inside the feed water pipe 60, the vapor inside the insertion pipe section 21 immediately flows off to the generator internal pipe section 62. Since the thermal stratification of the insertion pipe section 21 is suppressed, the feed water pipe 60 has an advantage that the thermal stress in the nozzle 11 is suppressed.

Particularly, in the feed water pipe 60 of the embodiment, the pipe path 62a of the generator internal pipe section 62 and a pipe path 21b of the insertion pipe section 21 exist in different regions in the vertical direction, and the pipe path 62a is positioned at the upside in the vertical direction in relation to the pipe path 21b. In other words, a lower end 62c of the cross-section perpendicular to the flow direction of the cooling water of the pipe path 62a of the generator internal pipe section 62 is positioned at the upside in the vertical direction in relation to the upper end 21a of the inner wall surface of the insertion pipe section 21 at the connection portion between the insertion pipe section 21 and the connection pipe section 64. Thus, the thermal stratification in the insertion pipe section 21 is further reliably suppressed. For example, even when the water level of the cooling water of the exterior space 40 is lowered so that the water level of the cooling water is lowered to the lower end 62c of the pipe path 62a inside the generator internal pipe section 62, the pipe path 21b of the insertion pipe section 21 may be filled with the cooling water. Accordingly, it is possible to effectively suppress the vapor from entering the pipe path 21b.

Further, in the embodiment, a communication pipe section 65 extends downward in the vertical direction so as to correspond to the structure in which the generator internal pipe section 62 is raised with respect to the insertion pipe section 21. The communication pipe section 65 is formed in a reverse J-shape as in the communication pipe section 25 of the first embodiment, and is provided with the communication path 66 which causes the pipe path 62a to communicate with the exterior space 40. One end 66a of the communication path 66 is connected to the upper end 62b of the cross-section perpendicular to the flow direction of the cooling water of the pipe path 62a. The other end 66b as the outflow port of the communication path 66 is positioned at the downside in the vertical direction in relation to the upper end 21a of the inner wall surface of the insertion pipe section 21 at the connection portion between the insertion pipe section 21 and the connection pipe section 64. Thus, since the other end 66b of the communication path 66 is not exposed to the gas layer even when the cooling water of the exterior space 40 decreases so that the upper end 21a of the inner wall surface of the insertion pipe section 21 is exposed, the vapor is suppressed from entering the generator internal pipe section 62.

Furthermore, the position of the other end 66b of the communication path 66 in the vertical direction may be positioned at the lower side of, for example, a lower end 21c of the inner wall surface of the insertion pipe section 21.

In this way, according to the feed water pipe 60 of the embodiment, the thermal stratification and the water hammer in the feed water pipe 60 may be suppressed. Particularly, the thermal stratification in the pipe path 21b of the insertion pipe section 21 may be effectively suppressed. Since the thermal stratification in the insertion pipe section 21 is suppressed, the thermal stress in the nozzle 11 is suppressed, and hence there is an advantage that the nozzle 11 is protected.

The content described in the respective embodiments above may be performed by the appropriate combination thereof.

INDUSTRIAL APPLICABILITY

As described above, the feed water pipe for the steam generator according to the invention may appropriately suppress the thermal stratification and the water hammer inside the pipe.

REFERENCE SIGNS LIST

1 steam generator
2 body section
11 nozzle
20, 60 feed water pipe
21 insertion pipe section
22, 62 generator internal pipe section
22a, 62a pipe path
22e communication hole
24, 64 connection pipe section
25 communication pipe section
26, 66 communication path

The invention claimed is:

1. A feed water pipe for a steam generator comprising:
a generator internal pipe section that extends in the horizontal direction inside a steam generator and includes a pipe path through which cooling water supplied from the outside of the steam generator circulates;
a communication pipe section that is connected to the generator internal pipe section and is provided with a communication path which allows communication between the pipe path and a space outside the generator internal pipe section inside the steam generator;
an insertion pipe section that is inserted into a penetration hole penetrating an outer shell member of the steam generator and that extends in a horizontal direction; and
a connection pipe section that is provided between the insertion pipe section and the generator internal pipe section, the connection pipe section being bent with respect to the insertion pipe section so as to raise the generator internal pipe section and introducing the cooling water supplied from the outside from the insertion pipe section to the pipe path,
wherein one end of the communication path is connected to the pipe path at an upper end of a cross-section perpendicular to a flow direction of the cooling water in the pipe path and another end of the communication path is positioned lower than the one end of the communication path in a vertical direction, and
wherein the upper end of the cross-section perpendicular to the flow direction of the cooling water of the pipe path is positioned upper than an upper end of an inner wall surface of the insertion pipe section in the vertical direction.

2. The feed water pipe according to claim 1,
wherein the another end of the communication path is positioned at or lower than a position of a lower end of the generator internal pipe section in the vertical direction.

3. The feed water pipe according to claim 1,
wherein the another end of the communication path is positioned lower than a target water level of the cooling water in the exterior space in the vertical direction.

4. The feed water pipe according to claim 1,
wherein the another end of the communication path is positioned lower than the upper end of the inner wall surface of the insertion pipe section in the vertical direction.

5. The feed water pipe according to claim 1,
wherein a lower end of the pipe path is positioned upper than the upper end of the inner wall surface of the insertion pipe section in the vertical direction.

* * * * *